United States Patent [19]

White

[11] Patent Number: 4,603,872
[45] Date of Patent: Aug. 5, 1986

[54] JET-SKI DOLLY

[76] Inventor: Peder S. White, 345 University Dr., L2, Costa Mesa, Calif. 92626

[21] Appl. No.: 731,870

[22] Filed: May 8, 1985

[51] Int. Cl.[4] ............................................. B62B 1/20
[52] U.S. Cl. ........................... 280/47.13 B; 16/114 R; 16/DIG. 24; 280/47.17; 280/47.32
[58] Field of Search ................. 280/47.13 B, 47.13 R, 280/47.17, 47.3, 47.32, 78; 114/344; 16/111 R, 114 R, DIG. 24

[56] References Cited

U.S. PATENT DOCUMENTS

| | | | |
|---|---|---|---|
| 1,109,520 | 9/1914 | Flower | 280/47.32 |
| 2,361,592 | 10/1944 | Bjork | 280/47.32 |
| 2,617,139 | 11/1952 | Bittel | 114/344 |
| 2,637,050 | 5/1963 | Oliver | 280/47.32 |
| 3,220,745 | 11/1965 | Du Charme | 280/47.32 |
| 3,567,241 | 3/1971 | Foschino | 280/47.32 |
| 3,812,814 | 5/1974 | Veilleux | 114/270 |
| 3,989,002 | 11/1976 | Peterson | 114/270 |

FOREIGN PATENT DOCUMENTS

| | | | |
|---|---|---|---|
| 2900283 | 7/1979 | Fed. Rep. of Germany | 280/47.13 B |
| 1041226 | 9/1966 | United Kingdom | 114/344 |

*Primary Examiner*—John J. Love
*Assistant Examiner*—Eric Culbreth
*Attorney, Agent, or Firm*—Francis X. LoJacono

[57] ABSTRACT

A dolly device for use as a carrier for jet skis, wherein the dolly includes a frame structure having a substantially U-shaped carriage bar formed to be removably mounted to the bow of a jet ski. The frame structure is supported by a wide-tread wheel. There is also included a pair of handles arranged to be removably mounted adjacent the sides of the rear portion of the jet-ski body, whereby an individual can lift the jet ski in a manner similar to that when lifting a wheel barrow.

4 Claims, 8 Drawing Figures

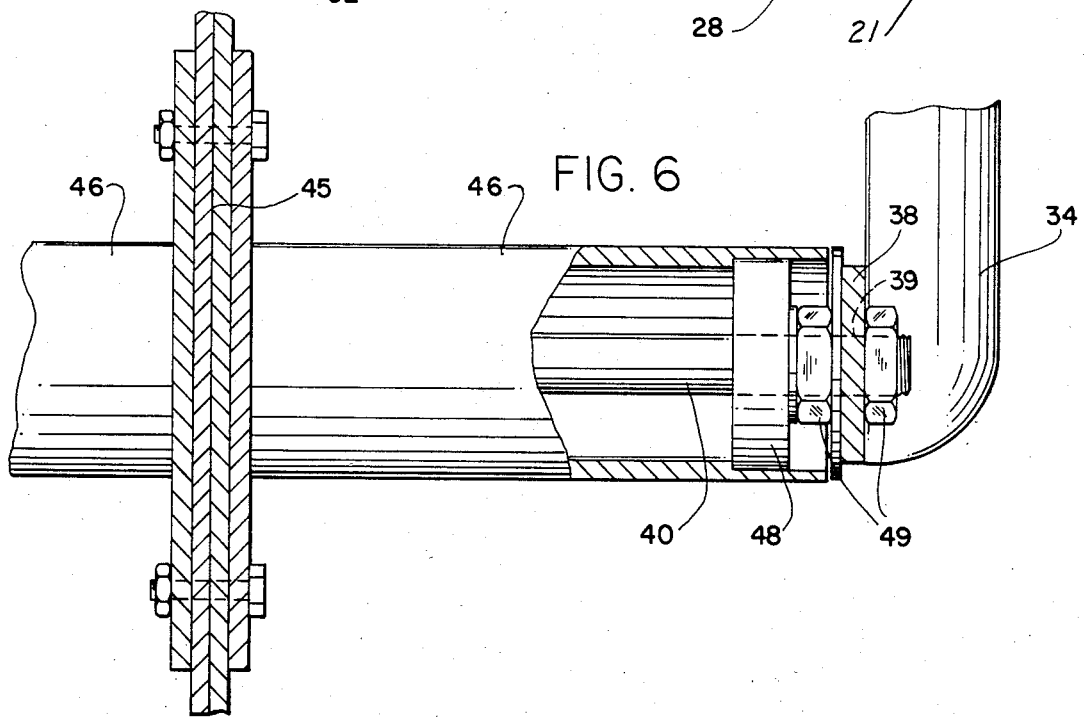

JET-SKI DOLLY

BACKGROUND OF THE INVENTION

Field of the Invention

This invention relates generally to a carrier or transport device, and more particularly to a dolly for transporting a jet ski.

There is no suitable means in the art for transporting a jet ski from one place to another. Under normal conditions, two or more individuals are needed to place a jet ski in the water or to take it from the water, and to transport the jet ski for any substantial distance.

Generally, when hauling a jet ski from one location to another, a two-wheel trailer, which is hitched to a vehicle or bed of a truck, is employed as a long-distance carrier. However, the main difficulty is encountered when the jet ski is taken from the trailer or truck and is transported to the body of water where it is to be used.

Whether the body of water be a lake, river or ocean, a jet ski must usually be transported a considerable distance from the vehicle or trailer to the water's edge. It is a particular problem when there is a sandy beach that must be traversed. Several types of dolly units have been employed but such known units have restrictive features. Some are difficult to operate, and others are designed so that, even though it takes only one individual to move a dolly, at least two individuals are needed to place the jet ski on the dolly.

SUMMARY AND OBJECTS OF THE INVENTION

The present invention has for an important object to provide a jet-ski carrier or dolly that overcomes the existing problems with the known carriers of this type, and to further provide a novel dolly arrangement whereby the jet ski can be removed from the water and carried with ease, by only one individual, to its primary transport vehicle.

Another object of the invention is to provide a jet-ski dolly device that has a frame structure which includes a single wide-tread tire, the frame structure having a substantially U-shaped cradle which is attached to the centrally positioned wheel by side leg members. The cradle is arranged to be removably mounted to the front of the jet ski by a pair of removable handles that are attached to the rear sides of the jet-ski body. Accordingly, the combination of the frame structure and the handles allows the jet ski to be transported in a manner similar to that when using a wheel barrow.

It is another object of the invention to provide a carrier or dolly device for a jet ski that allows the unit to be easily transported or moved over very-sandy beach areas by use of the single wide-tread tire.

It is still another object of the present invention to provide a dolly of this character that is designed to be readily used and controlled by one individual without requiring assistance.

A further object of the invention is to provide a dolly or carrier of this character that is formed with few operating parts, and is easy to service and maintain.

It is still a further object of the present invention to provide a dolly of this type that is simple and rugged in construction, and is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements of modes of operation that are properly within the scope of the appended claims.

BRIEF DESCRIPTION OF THE DRAWINGS

Referring more particularly to the accompanying drawings, which are for illustrative purposes only, and wherein like reference numerals refer to like elments thereof:

FIG. 5 is an enlarged cross-sectional view showing the mounting pin of the dolly mounted within the overhang edge of the jet-ski body;

FIG. 6 is an enlarged cross-sectional view taken substantially along line 6—6 of FIG. 2 showing the axle arrangement thereof;

FIG. 7 is a perspective view of one of the handles arranged to be removably hooked to the rear-side overhang of the water jet ski; and FIG. 8 is a cross-sectional view of the ski-body overhang showing a portion of the handle mounted thereon.

DESCRIPTION OF THE PREFERRED EMBODIMENT

Figure 1:
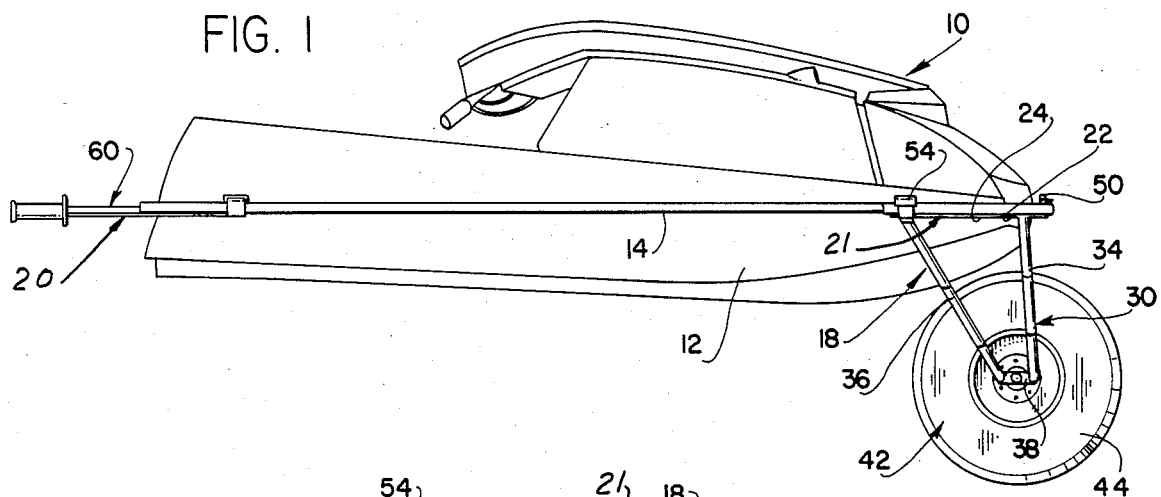
FIG. 1 is a side-elevational view showing a typical jet ski having the present invention attached thereto in a position for transporting or moving the jet ski.

Referring more particularly to FIG. 1, there is illustrated a typical water-jet-ski unit, generally indicated at 10. The jet ski is shown having an elongated body 12 which is formed with a peripheral overhang member 14 provided with a depending flange member 16, as illustrated in FIG. 5. Mounted to the front end of the jet ski 10 is a dolly or carrier structure, designated generally at 18, there being a lifting means, generally indicated at 20, mounted adjacent the rear end of the jet ski 10.

The dolly structure 18 comprises a framework that includes a carriage base 21 which is formed to correspond to the front-end configuration of the jet ski, so as to firmly support the jet ski above the ground. Carriage base or cradle 21 is formed in a substantially U-shaped configuration to match the forward configuration of the peripheral overhang member 14, which somewhat defines the bow of the jet ski.

Accordingly, a U-shaped carriage bar 22 is defined by a single, continuous, tubular member bent to establish two oppositely disposed side members 24 which terminate at one end and extend in the opposite direction to form an angular nose member 28, thus providing the base of the U-shaped carriage bar 22.

Secured to and depending from carriage bar 22 are two oopositely arranged, wheel-support struts 30 which are adapted to receive therebetween a single, central, wheel means, indicated generally at 32. Each wheel-support strut 30 includes a first depending leg member 34 secured at its upper end to carriage bar 22 adjacent nose section 28, and a second leg member 36 that is secured to carriage bar 22 adjacent the terminating end thereof.

Figure 2:
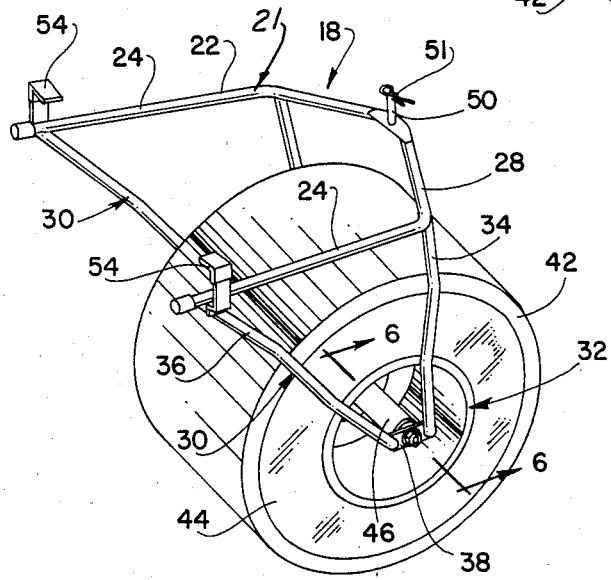
FIG. 2 is a perspective view of the dolly-frame structure.
Figure 3:
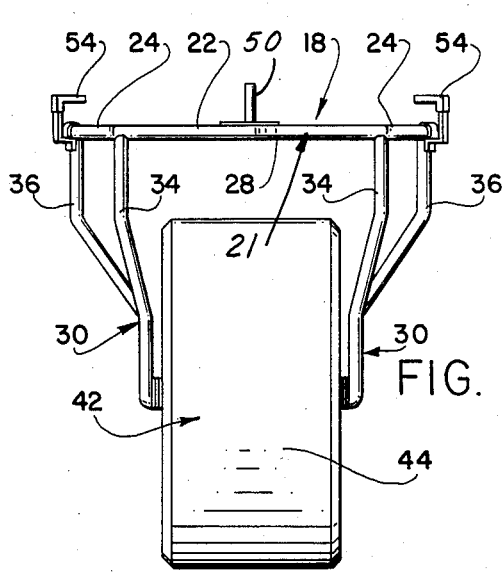
FIG. 3 is a front-elevational view thereof.
Figure 4:
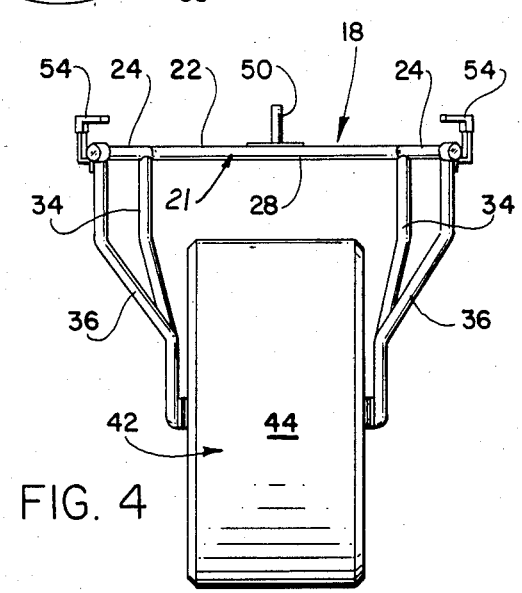
FIG. 4 is a rear-elevational view thereof.

Leg members 34 and 36 extend downwardly from carriage bar 22 and are secured to wheel-support plate 38, as illustrated in FIG. 2. The wheel-support plate is suitably affixed to the ends of leg members 34 and 36 in a suitable manner, such as by welding. Plate 38 is also provided with a hole 39 to receive axle 40 of wheel 42 which includes tire 44 mounted to a central rim member 45 provided with an axle housing 46 which extends laterally to each side thereof, as shown in FIG. 6. Axle 40 is supported in housing 46 by bearing 48, the free end of axle 40 being secured to wheel-support bar 38 by means of a nut member 49. Hence, wheel 42 is allowed to freely rotate about axle 40. However, it is contemplated that a pair of wheels may be provided to establish greater stability.

Means for removably attaching dolly structure 18 to the bow of jet ski 10 is provided by a front nose stud 50 which is secured to the apex of the nose section 28 so as to project upwardly through bore 52 formed in overhang 14, as illustrated in FIG. 5. A removable locking pin 51 is used to lock stud 50 in place. The attaching means further includes hook members 54 which are secured adjacent each terminated end of the side sections 24. The hook members are shown having protective surfaces.

In order to mount dolly structure 18 to the bow of jet ski 10, one would raise the bow and slide the dolly underneath, so that the carriage bar 22 is positioned under the peripheral overhang 14 to cradle the jet ski, as shown in FIGS. 1 and 5. Hooks 54 are at the same time positioned above overhang 14, thus securing the dolly in a substantially fixed mode.

To allow for simple lifting and moving of jet ski 10, a lift means is provided which can be defined by suitable handles, such as at 60. FIG. 7 shows the preferred arrangement of the handles. That is, there are two handle structures—one being adapted to be removably attached to the right side of the aft of body 12, and the other being adapted to be removably attached to the left side thereof. Thus, the handle illustrated in FIG. 7 is a right-hand handle defined by an elongated handlebar 62 having a hand grip 64 mounted at one end thereof and a support hook 65 secured to the opposite end thereof.

As shown in FIG. 8 fixedly secured intermediate grip 65 and hook 65 is a projecting latch tongue 66. When mounting handlebar 62, hook 65 is positioned on the rear-side portion of overhang 14, and latch tongue 66 is snapped under the overhang flange 16 as an upward lifting force is applied to the gripping end of each handle 60. This will cause a firm engagement between the handles and the overhang 14, allowing the aft of body 12 to be raised as shown in FIG. 1.

Once both handles are mounted to the ski body 12, one merely lifts the jet ski as one would lift a wheel barrow. Thus, the present invention provides a simple means to allow one to easily transport a jet ski as a unit for short distances to and from a main carrier vehicle, such as a truck or trailer.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A dolly apparatus arranged to be removably mounted to a jet-ski vehicle having a peripheral overhang for the transporting thereof, comprising:
   a framework adapted to be removably attached to the bow of said jet-ski vehicle;
   means mounted on said framework for removably attaching said framework to said bow;
   at least one wheel rotatably mounted to said framework;
   handle means arranged to be removably mounted adjacent the rear of said jet-ski vehicle;
   removable mounting means affixed to said handle means for removably mounting said handle means to said jet-ski vehicle;
   said framework comprising:
   a carriage bar formed to fit the configuration of said bow of said jet-ski vehicle; and
   wheel-support struts fixedly secured to said carriage bar, and arranged to receive and support said wheel therebetween;
   and wherein said removable attaching means comprises:
   a nose stud mounted to said carriage bar and positioned to engage said peripheral overhang disposed about said jet-ski vehicle; and
   a pair of hook members fixedly secured to said carriage bar, and formed to engage said peripheral overhang;
   wherein said handle means comprises a pair of elongated handlebars, said removable mounting means being mounted on each of said handlebars, and each of said removable mounting means comprises a hook member mounted adjacent one end of said handlebar for locking engagement with said overhang and a latching tongue positioned adjacent the opposite end of said handlebar for engagement with said overhang when upward force is applied to said handlebar.

2. A dolly apparatus as recited in claim 1, wherein said carriage bar is formed having a substantially U-shaped configuration defined by a pair of oppositely disposed side members and an integrally formed nose member.

3. A dolly apparatus as recited in claim 2, wherein said wheel includes a wheel rim having an axle housing so as to be rotatably supported on an axle passing therethrough and a wide-tread tire mounted on said rim.

4. A dolly apparatus as recited in claim 3, wherein each of said wheel-support struts comprises a pair of depending leg members secured at one end to said carriage bar, said opposite end thereof being secured to a wheel-support plate on which said axle is mounted.

* * * * *